Feb. 14, 1933.  R. D. PARKS ET AL  1,897,072
VENDING MACHINE
Filed Dec. 24, 1928   8 Sheets-Sheet 1

Feb. 14, 1933.    R. D. PARKS ET AL    1,897,072
VENDING MACHINE
Filed Dec. 24, 1928    8 Sheets-Sheet 5

Inventors
Robert D. Parks and
By Glenn Hildenbrand.

Feb. 14, 1933.  R. D. PARKS ET AL  1,897,072
VENDING MACHINE
Filed Dec. 24, 1928   8 Sheets-Sheet 7

Inventors
Robert D. Parks and
Glenn Hildenbrand.
By
Atty.

Feb. 14, 1933.  R. D. PARKS ET AL  1,897,072
VENDING MACHINE
Filed Dec. 24, 1928   8 Sheets-Sheet 8

Inventors,
Robert D. Parks and
Glenn Hildenbrand.
By
Eugene Evans Atty.

Patented Feb. 14, 1933

1,897,072

UNITED STATES PATENT OFFICE

ROBERT D. PARKS AND GLENN HILDENBRAND, OF LOHRVILLE, IOWA, ASSIGNORS TO SELF-SERVE BOTTLE VENDOR COMPANY, OF FORT DODGE, IOWA, A CORPORATION OF IOWA

VENDING MACHINE

Application filed December 24, 1928. Serial No. 328,190.

This invention relates to coin or token operated vending machines and more particularly machines for vending bottled goods, such as soft drinks.

One object of the invention is to provide a mechanism which is rendered operative to eject a bottle only on the insertion of a coin or token of the proper size or value, thereby preventing spurious operation of the machine.

Another object of the invention is to cause the coin or token when dropped into the machine to operatively connect the handle and the ejector device so that the mechanism is conditioned for operation through the interposition of the inserted coin or token.

A further object of the invention is to provide a gravity feed and storage rack for the articles handled by the machine, the rack containing a tier of downward inclined shelves for feeding the articles thereon by gravity into the discharge passage associated with the rack.

A further object of the invention is to provide means controlled by the movement of the articles down the discharge passage to successively open the shelves thereto so that the feed of the articles from the shelves will not block or hinder the movement of the articles down said passage.

A further object of the invention is to provide a platform at the lower end of the discharge passage to receive the articles therefrom and permit the ejector mechanism to discharge the articles one at a time from said platform.

A further object of the invention is to have the ejector mechanism constructed and arranged to support the articles in the discharge passage while discharging an article from the platform and thus relieve the ejected article of the weight of the articles thereabove.

A further object of the invention is to have the platform vertically movable, with means for raising the platform up to the articles supported by the ejector mechanism so as to transfer the weight of the articles from the ejector mechanism to the platform without breakage or jar as soon as the ejector mechanism releases the articles in the discharge passage.

A further object of the invention is to provide means for retarding the descent of the platform under the weight of the articles thereon so that the platform may move down to its discharging position without affording any possibility for the articles to separate and drop against one another to break or crack during the descent of the platform.

A further object of the invention is to provide a novel form of means for returning a rebate to the customer on the return of an empty bottle into the machine, such rebate being in the form of a coin or token of a lesser denomination than inserted in the machine to secure a filled bottle.

A further object of the invention is to cause the rebate coin ejecting mechanism to be operated in the movement of the empty bottles into the compartment of the machine provided for that purpose, said mechanism having an operating handle exterior of the machine, which is moved by the customer after inserting an empty bottle into the machine.

A further object of the invention is to provide a gauge for the empty bottles so that only the particular bottles as dispensed by the machine may be returned thereto, thereby preventing spurious operation of the machine to rob it of its supply of rebate coins.

A further object of the invention is to provide a bottle ejecting and coin rebate mechanism of such a character that it is adaptable to a machine the outer casing of which may be made in the shape of an enlarged bottle of the type and character which is vended by the machine.

The invention consists further in the matters hereinafter described and claimed.

In the accompanying drawings—

Figure 1:
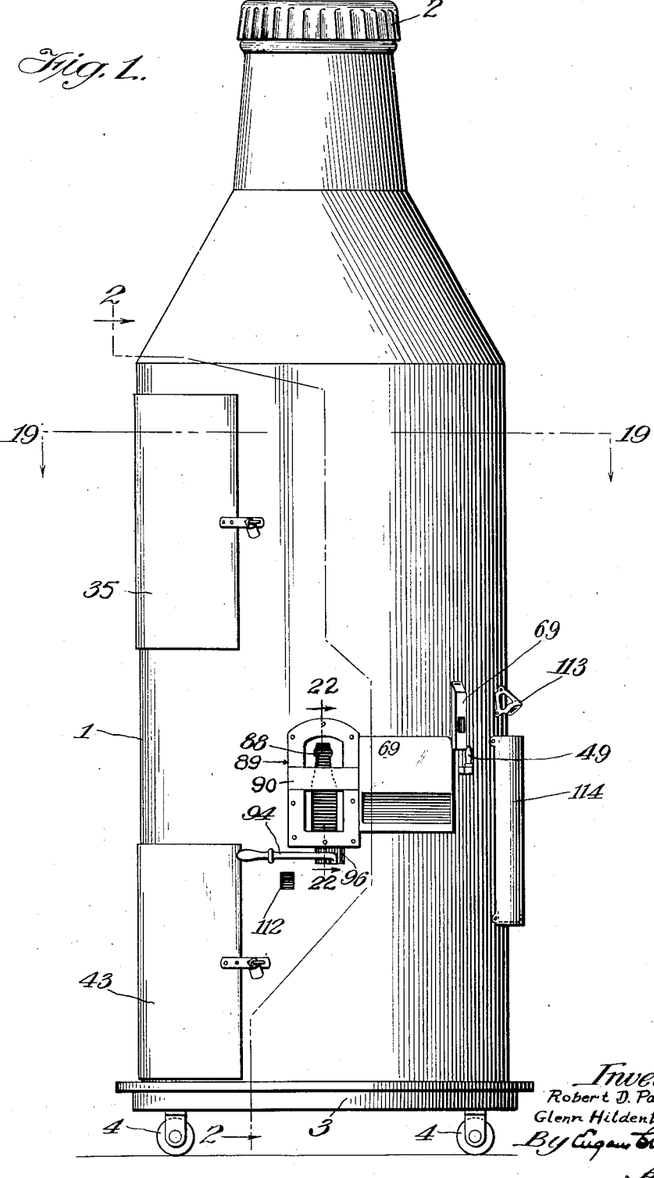
Fig. 1 is a front view of my improved vending machine.

In Fig. 1, the outer casing 1 of the machine is made in the form of a gigantic bottle having the representation of a crimp cap 2 at its upper end and a platform 3 at its lower end, which platform is provided with rollers 4, 4 to provide a movable support for the machine. The outer casing 1 may have the shape of the particular bottles dispensed by the machine and also may be given a color representative of the color of the liquid contents of such bottles so as to be suggestive of the character of beverage sold.

Figure 2:
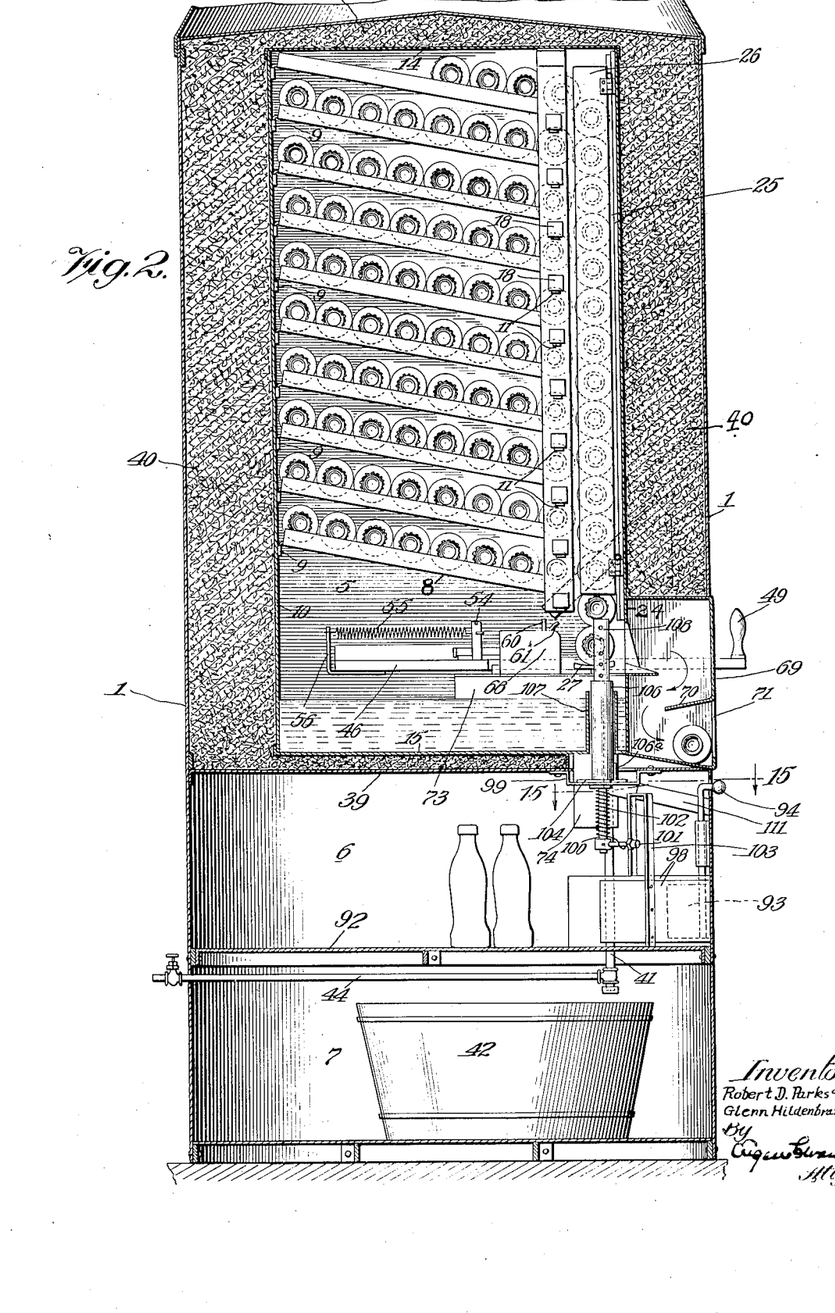
Fig. 2 is an enlarged vertical sectional view through the machine on the indirect line 2—2 of Fig. 1.

As shown in Fig. 2, the interior of the casing 1 is divided into a number of super-imposed compartments 5, 6 and 7. The upper compartment 5 contains a gravity feed and storage rack from which the filled bottles are fed to the coin operated bottle ejecting mechanism of the machine, said rack being of a size and shape to hold a considerable number of filled bottles so as to avoid the necessity of too frequent reloading of the machine.

Figure 3:
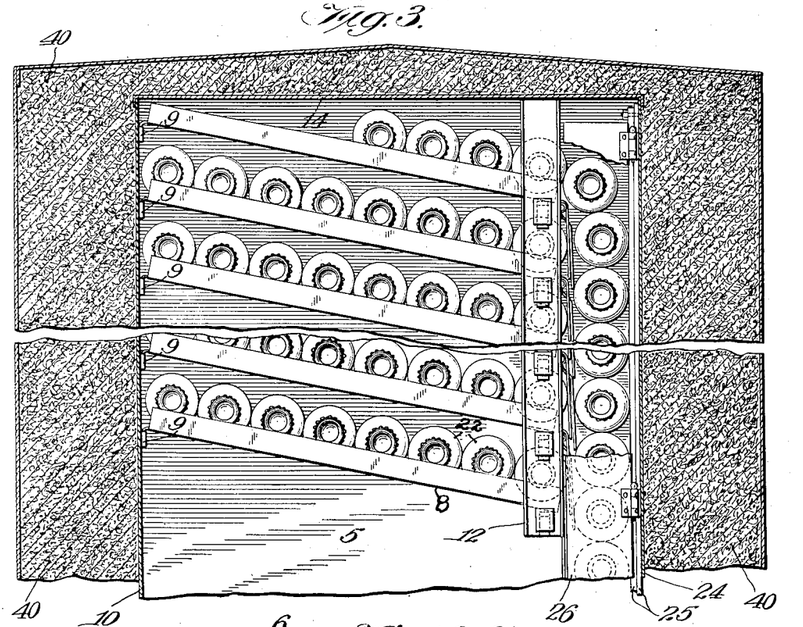
Fig. 3 is an enlarged vertical sectional view taken through gravity feed and storage rack on line 3—3 of Fig. 19, the gates of the rack being shown.
Figure 19:
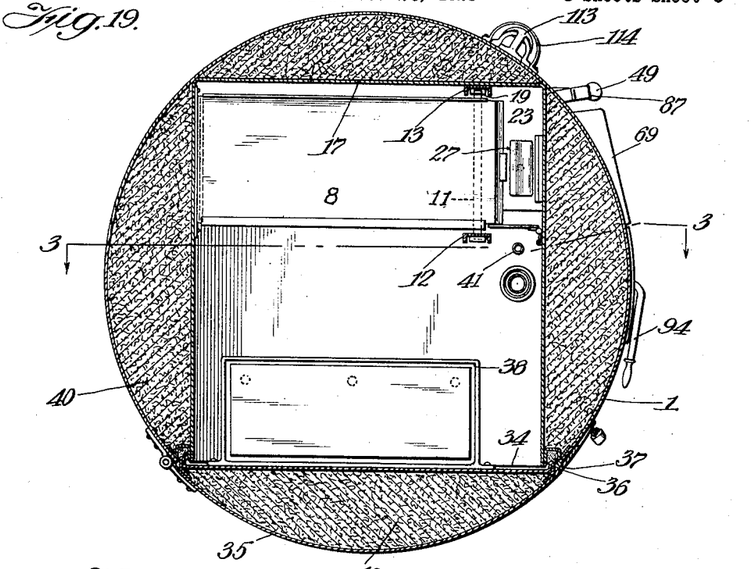
Fig. 19 is a horizontal sectional view taken through the machine on line 19—19 of Fig. 1.
Figures 20, 21:
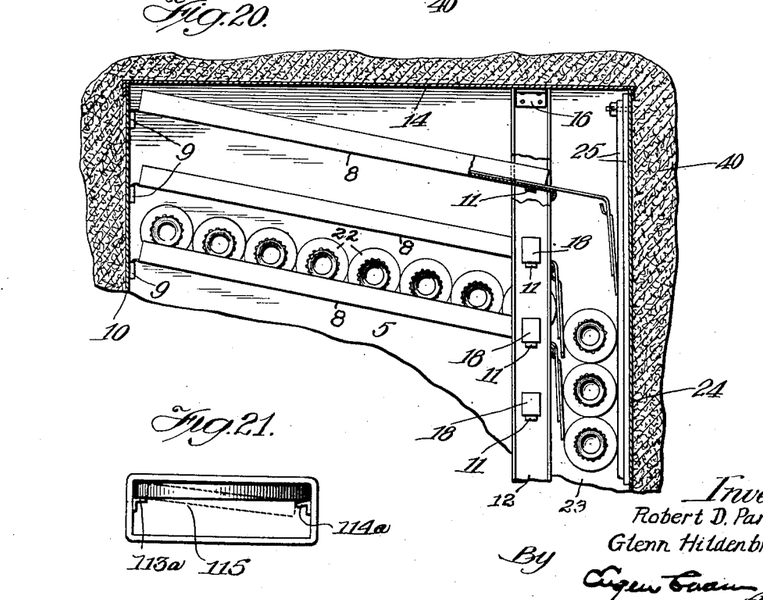
Fig. 20 is a view illustrating the action of the gates at the discharge ends of the shelves of the rack.
Fig. 21 shows another form of coin chute.

The rack comprises a tier of sheet metal shelves 8, 8 arranged at a downward inclination and having their upper ends supported by brackets 9, 9 provided on the adjacent inner wall 10 of the compartment 5, as shown in Figs. 2 and 3. The lower ends of the shelves are supported on horizontal cross-bars 11, 11 which extend between and are detachably secured to upright channel members 12, 13, both of which extend downward from the top wall 14 of the compartment 5, as shown in Figs. 2, 3, and 20. The lower ends of the members 12, 13 terminate short of the bottom wall 15 of said compartment, as shown in Fig. 2. The outer member 12 is secured by a bracket 16 to the top wall 14, as shown in Fig. 20, while the inner member 13 is secured to the adjacent rear wall 17 of said compartment, as shown in Fig. 19. The ends of the bars 11 are bent downward and engage in apertures in the members 12, 13 made by striking out portions 18, 19 of said members.

Figures 5, 6:
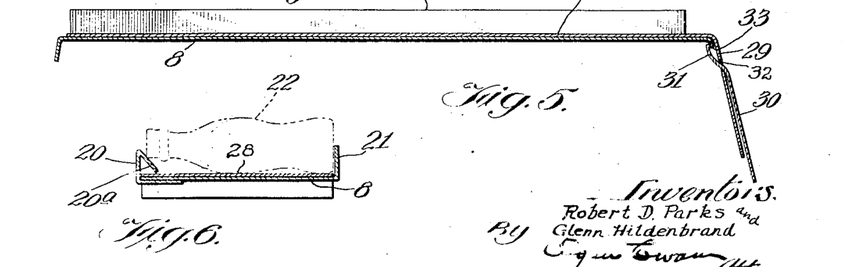
Fig. 5 is a vertical sectional view taken through the shelf on line 5—5 of Fig. 4.
Fig. 6 is a transverse sectional view of the shelf taken on line 6—6 of Fig. 4.

Each shelf 8 is provided with upright side walls 20, 21 to provide a trough to accommodate the filled bottles 22 which are arranged flatwise in the trough, as indicated in Fig. 6. The wall 20 has an inwardly inclined flange 20a on which the head or mouth ends of the bottles rest to hold the bottles from tipping as they roll down the channel.

The troughs as provided by the shelves 8 open at their lower discharge ends into a vertically disposed discharge passage 23, which is formed in the compartment 5 between the lower ends of the shelves and the opposed upright inner wall 24 of said compartment.

Vertically disposed shim plates 25, 25 are secured in the passage 23 against the inner side of the wall 24 so as to condition the passage for the diameter of the bottles passing therethrough. A door 26 extends between the wall 24 and the outer member 12 to normally close the outer side of the passage 23 and prevent the bottles in the passage from dropping or working out of the same. The door 26 is preferably hinged to the wall 24 and is provided with any form of latch on its opposite edge to engage the member 12 for holding the door closed.

Figure 4:
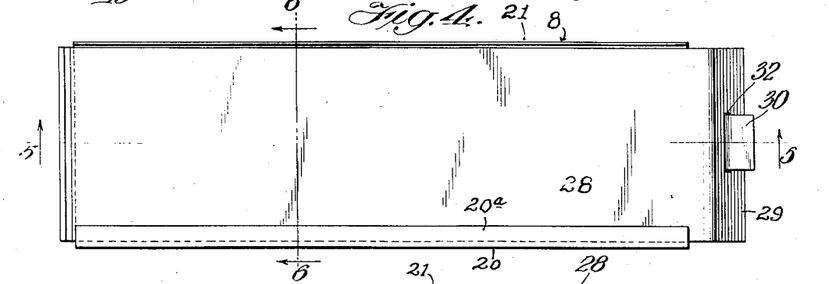
Fig. 4 is an enlarged top plan view of one of the shelves of the rack.

A platform 27 is arranged below the lower end of the passage 23 to support the tier of bottles in said passage, as shown in Fig. 2. In loading the rack, this passage is first filled with filled bottles, the door 26 being open so as to permit the bottles to be inserted endwise into the passage. The passage is filled to the top of the rack and additional bottles are placed in the troughs as provided by the shelves 8 and their side walls 20, 21 with as many bottles on the top shelf as may be placed on the same as permitted by the closeness of the top wall 14 to the top shelf. A gate mechanism is provided at the discharge ends of the troughs to control the feed of the bottles therefrom into the discharge passage 23, said gate mechanism being controlled by the movement of the bottles or other articles handled by the machine down said passage. Each gate comprises a flat sheet metal plate 28 substantially as long as the associated shelf 8 and slidably supported on top of the same, as shown in Figs. 4 and 5. The plate 28 is also as wide as the shelf 8 and has one of its side margins under the flange 20a so as to be held thereby from upward displacement with respect to the shelf 8. The outer end portion 29 of the plate is bent downward and extends toward the shelf therebelow so as to provide a stop for the row of bottles on the lower shelf.

A strip 30 is vertically arranged on the outer side of the stop 29 and has its upper end forming a tongue 31 which extends to the rear side of the stop 29 through a slot 32 provided therein, as shown in Fig. 5. The strip 30 extends below the stop 29 on its outer side and releasably holds the bottles engaged thereby against the outermost shim plate 25 so as to prevent a too rapid descent of the bottles in the passage 23. The tongue 31 at this time engages behind a lip 33 at the adjacent end of the shelf 8 so as to normally hold the lower portion of the strip 30 slightly separated from the stop 29 to allow for the yielding action referred to. When the uppermost bottle in the passage 23 passes below and out of contact with the lower end of the strip 30, the inward pressure on said strip is released and it springs outward to release the tongue 31 from the lip 33, whereupon the weight of the bottles against the inner side of the stop 29 will move the stop outward across the passage 23 and release the bottles for entry into said passage. (See Fig. 20.)

The compartment 5 is provided with an entrance opening 34 for which there is a hinged door 35 having a surrounding marginal flange 36 which impinges against a packing gasket 37 arranged about the openings 34 to hermetically seal the same when the door is closed. A perforated receptacle 38 is removably carried on the inner side of the door 35 to hold the ice required to refrigerate the filled bottles in the compartment 5 and thus permit the machine to vend ice-cold drinks.

A horizontal partition wall 39 is arranged in the casing 1 below the bottom wall 15 of the compartment 5 so as to provide in connection with the walls of that compartment and the casing 1 a hollow space which is filled with a suitable heat-insulating packing 40 to prevent heat entering the compartment 5.

The door 35 is also made hollow and is filled with such packing. A suitable lock is provided for locking the door 35 closed so as to prevent theft of the filled bottles therein.

A drain pipe 41 extends downward from the compartment 5 through its bottom wall 15 and continues through the compartment 6 and discharges into a suitable receptacle 42 in the compartment 7, as shown in Fig. 2. A hinged door 43 closes the entrance opening into these compartments and this door also has a lock to lock it closed. The pipe 41 extends high enough above the bottom wall 15 so as to maintain a certain amount of water in the bottom of the compartment 5 for the purpose of filling the dash pot, to be presently described. A pipe 44 is connected with the lower end of the drain 41 so that the compartment 5 may be drained exterior of the device if desired.

The bottle ejecting mechanism is arranged in the compartment 5 beneath the lower end of the rack and above the water level therein, as shown in Fig. 2. Said mechanism comprises a horizontally disposed channel member 45 having upright side walls 46, 47. Said member 45 is secured to the upright wall 17 of the compartment 5 with its side wall 46 against the same. Slidably mounted in the channel member 45 is a bar 48, the outer end of which extends outward through the casing 1 and is there provided with an actuating handle 49. An angle bar 50 extends into the channel member 45 through a slot 51 in its outer side wall 46, as shown in Figs. 10 and 12.

Figures 10, 11, 12, 13, 14:
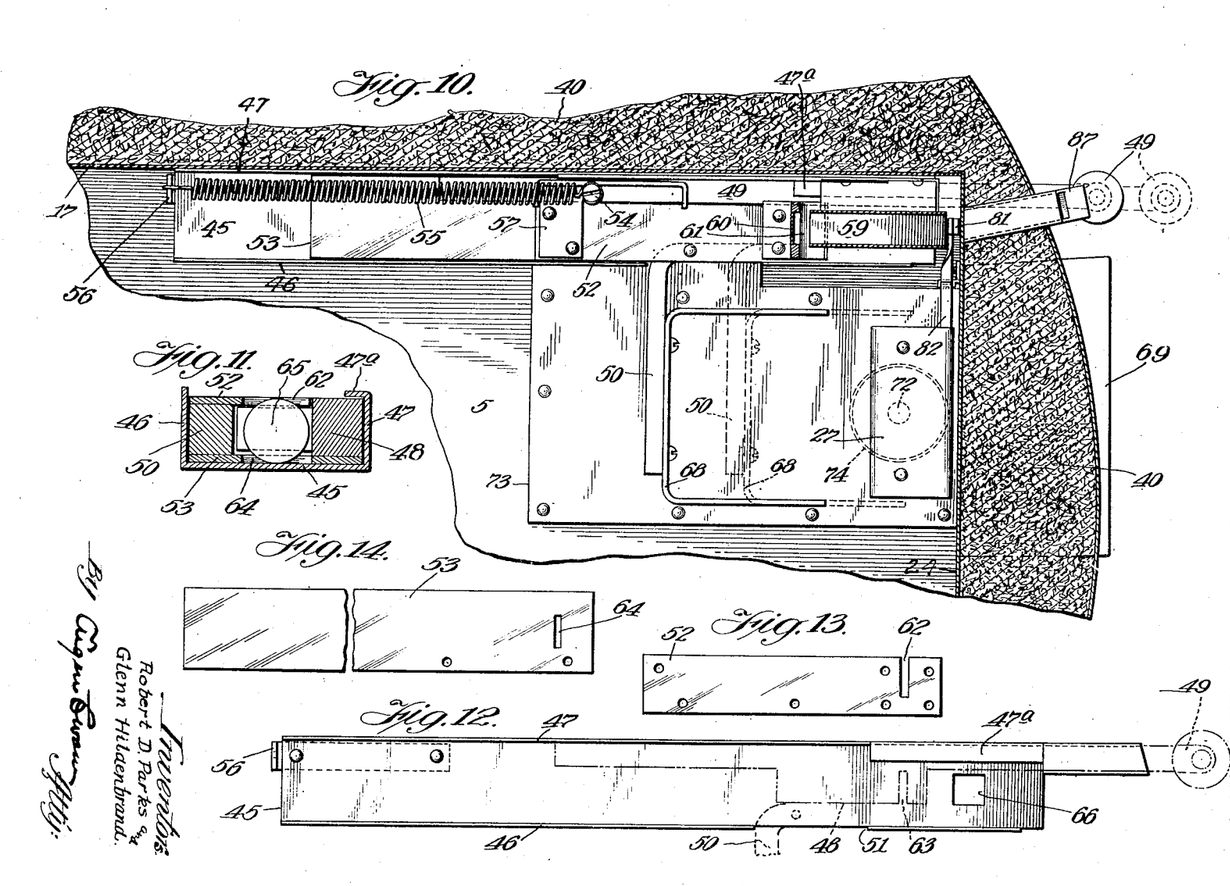
Fig. 10 is an enlarged plan view taken on the indirect line 10—10 of Fig. 8.
Fig. 11 is a vertical sectional view showing the manner in which a coin or token of the proper size conditions the bottle ejecting mechanism for operation.
Fig. 12 is a top plan view of the channel member which supports the operative parts of the ejector mechanism.
Figs. 13 and 14 are plan views of the top and bottom plates of said mechanism.

Plates 52 and 53 are secured to the upper and lower sides of the portion of the bar 50 in the channel member 45 with the plate 52 on the top side of the bar and the plate 53 on the under side of the same and extending completely across the channel and under the adjacent portion of the bar 48, as shown in Fig. 11. A flange 47a at the top of the side wall 47 extends inward over the bar 48 to hold it in the channel. The top plate 52 terminates at the bar 48 and secured to this bar adjacent the inner end of the plate is an upright pin 54 to which is secured the forward end of a coiled spring 55. The other end of this spring is secured to the upper portion of an angle bracket 56 which is fastened to the under side of the channel member 45, as clearly shown in Fig. 2. A stop 57 is secured to the top side of the plate 52 in rear of the pin 54, as shown in Fig. 10.

Figure 8:
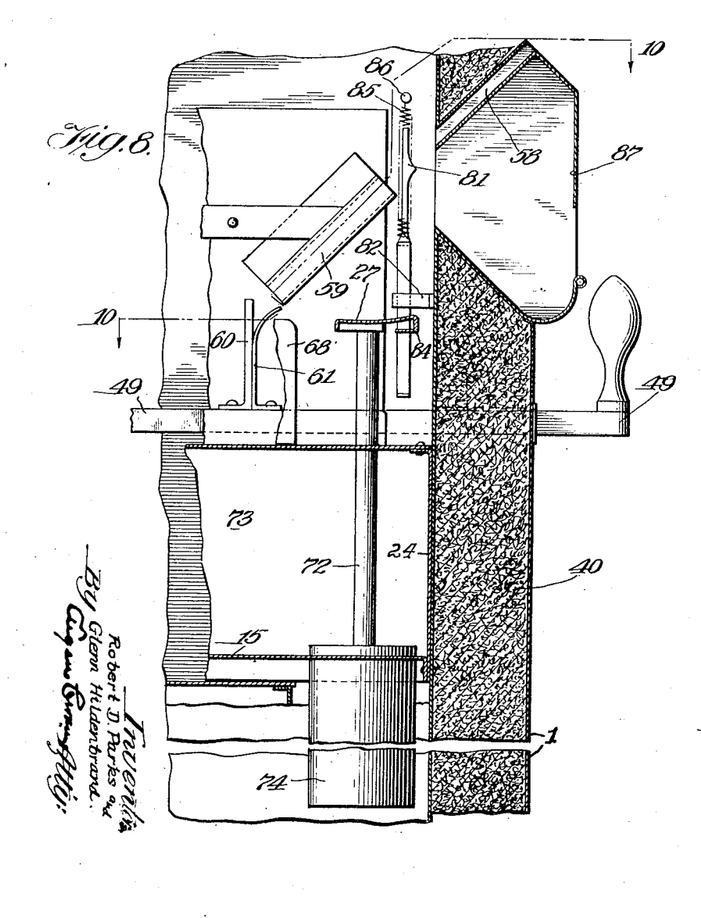
Fig. 8 is a vertical sectional view through the bottle ejecting mechanism taken on line 8—8 of Fig. 9, the guard for the coin chute being shown.
Figure 9:
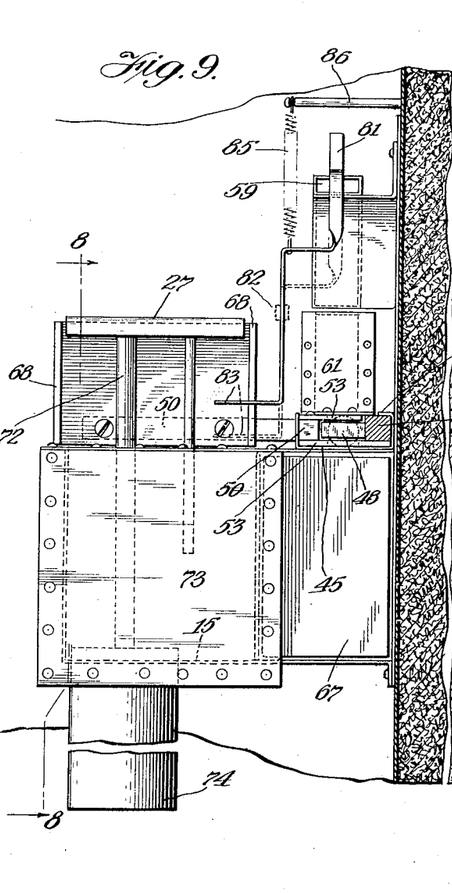
Fig. 9 is a vertical sectional view taken through the structure of Fig. 8 in front of the coin guard.

The coin chute for the ejecting mechanism has aligned outer and inner inclined portions 58, 59. The outer portion 58 extends through the casing 1 and the packing 40 and opens through the wall 24 in line with the inner portion 59, as shown in Figs. 8 and 10. The inner portion 59 discharges into a channel provided in an upright member 60 which is secured to and carried by the top plate 52 adjacent its forward end. A guard 61 with a flared upper end is secured to the top plate 52 over the channel 60 and provides a covering therefor so as to guide the coin or token entering the channel into a number of openings 62, 63, 64 in the top and bottom plates 52, 53 and the interposed portion of the handle bar 48, respectively, when said openings are in register. These openings are arranged to extend crosswise of the parts in which they are provided so that the coin in sliding flatwise down the coin chute may enter the openings and come to rest on the bottom wall of the channel member 45, as shown in Fig. 11, where the coin is indicated by 65. When the coin is so disposed the bars 48 and 50 are locked together through the coin so that the bar 50 will be moved forward in the outward movement of the bar 48 to eject a bottle from the platform 27 and shift the coin into register with an opening 66 in the bottom wall of the guide 45 to drop the coin into the coin receptacle 67 which is secured in the compartment 5 below the opening 66, as indicated in Fig. 9. This receptacle may be made in the form of a drawer so that it may be removed for emptying its collection of coins.

In the outward movement of the handle bar 48 to discharge a bottle from the platform 27, the spring 55 is expanded so as to return the parts to their coin-receiving positions, when the handle bar is released. As the spring 55 contracts it carries the pin 54 rearward and through the stop 57 on the rear side of the pin carries the plates 52 and 53 and the attached bar 50 back to their coin receiving positions.

An ejector yoke 68 is secured to the front side of the portion of the bar 50 exterior of the channel member 45 and said yoke straddles the platform 27 in the outward movement of the bar with the handle 49 so as to eject a bottle contained on the platform 27 into a casing 69. The latter is located opposite the platform between the outer casing 1 and the wall 24 of the compartment 5, as shown in Fig. 2. The ejected bottle falls on a baffle wall 70 arranged in this casing and drops into the bottom of the casing and rolls outward toward an opening 71 through which the ejected bottle may be taken from the machine. The baffle wall 70 provides a guard within the casing 69 so that no entry can be had into the casing to reach a bottle on the platform 27.

The platform 27 is depressibly mounted and is held down in its lowermost position by the weight of the bottles thereon, as shown in Fig. 2, in which position the bottle on the platform is disposed so as to be ejected into the casing 69 in the forward actuation of the ejector yoke 68. This yoke, as shown in Fig. 10, is wider than the platform 27 so that it straddles it as it moves over the platform, and also has height sufficient to engage under the bottle immediately above the platform so as to hold the bottles in the passage 23 from prematurely descending as the lowermost bottle is ejected from the platform. When relieved of a bottle, the platform ascends, due to the dash pot mechanism to be presently described, and comes up high enough to reach the bottle which is directly supported by the yoke 68 so that when said yoke is retracted by the spring 55 the bottles are immediately supported by the platform and the latter gradually descends under the weight of the load into its lowermost position, as shown in Fig. 2, without any opportunity afforded for the bottles to drop and break.

Figure 7:
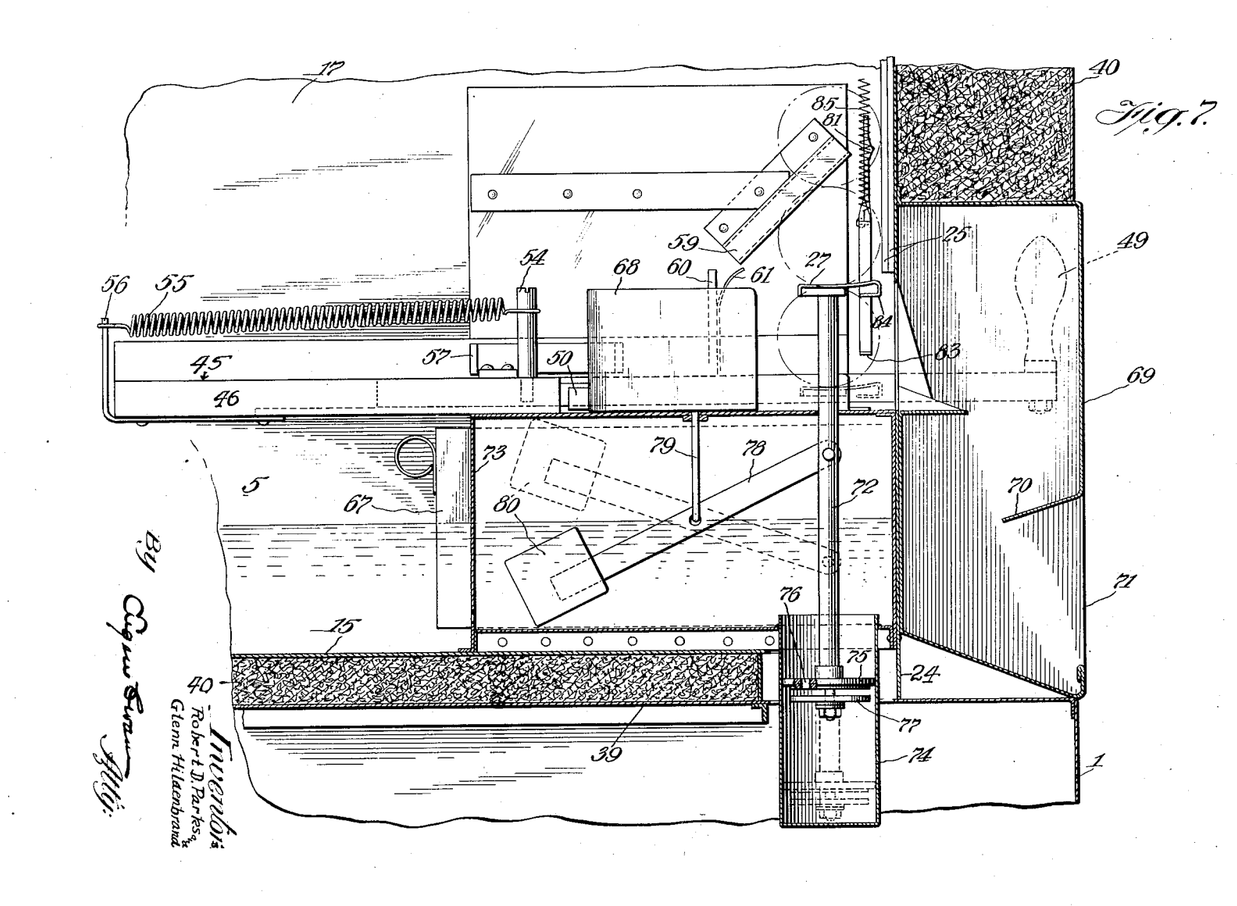
Fig. 7 is an enlarged vertical sectional view taken through the machine at the bottle ejecting mechanism and showing the dash-pot arrangement.

The platform 27 is secured to the upper end of a vertically movable plunger rod 72, which extends downward through a water containing chamber provided by a casing 73, which is supported by the bottom wall 15 of the compartment 5 directly beneath the shifter yoke 68, as shown in Fig. 7. The lower end of the plunger rod 72 extends into a dash pot cylinder 74 which depends from the lower end of the casing 73 and opens into the same so as to be filled with water therefrom. A piston 75 fits in the cylinder and is secured to the lower end of the plunger 72, said piston having a plurality of port holes 76 through which water may pass.

A loose disc or valve plate 77 is carried by the plunger 72 below the piston 75 so as to uncover the ports 76 in the upward movement of the plunger and thus permit a quick ascent of the same. The disc 77 closes the ports 76 in the downward movement of the plunger so as to materially restrict the flow of water through the ports and thus retard the downward movement and prevent a too sudden descent of the plunger to avoid breakage of the bottles above the same. Arranged in the casing 73 is a lever 78 fulcrumed between its ends on the lower end of a bracket 79, which is fastened to and extends downward from the top wall of the casing, as shown in Fig. 7. One end of the lever 78 is pivotally connected to the plunger 72 and a counter-weight 80 is applied to the other end of the lever so as to regulate the speed of up and down movement of the plunger.

A guard member 81 is provided to prevent a coin entering the inner portion 59 of the coin chute when the machine is empty. The guard 81 is in the form of an angularly bent strip supported in upright position by a bracket 82 secured to the adjacent inner wall 24 of the compartment 5, as shown in Fig. 8. The lower end 83 of the guard extends beneath a projection 84 on the platform 27 so that when the platform is depressed to its lowermost position by the weight of the bottles thereon, the guard 81 will be moved downward and its upper portion withdrawn from between the outer and inner parts 58, 59 of the coin chute, as is apparent from Figs. 8 and 9. When the platform 27 is relieved of a bottle by the action of the ejector yoke 68, or when the last bottle has been discharged from the device, the platform 27 in raising frees the lower end 83 of the guard 81 and a coiled spring 85, which is attached to the guard, raises it and projects its upper end into the space between the inner and outer portions of the coin chute, as shown in Fig. 8. The upper end of the spring 85 is connected to an inwardly extending pin 86 carried by the adjacent inner wall of the compartment 5. When the guard 81 is in this position, it will intercept a coin dropped into the coin chute and deflect it into a return coin receptacle 87 mounted in the casing 1 and accessible from the outside of the casing so that the returned coin may be retrieved.

The compartment 6 forms a space to receive the empty bottles, the latter being inserted into said compartment through a bottle receiving opening 88 accessible from the exterior of the machine. The opening 88 is made to conform to the shape and size of the bottle dispensed by the machine so that no other bottles can be inserted into the machine, thereby preventing the unauthorized actuation of the coin-rebate mechanism, to be presently described.

Figures 15, 16, 17, 18, 22:
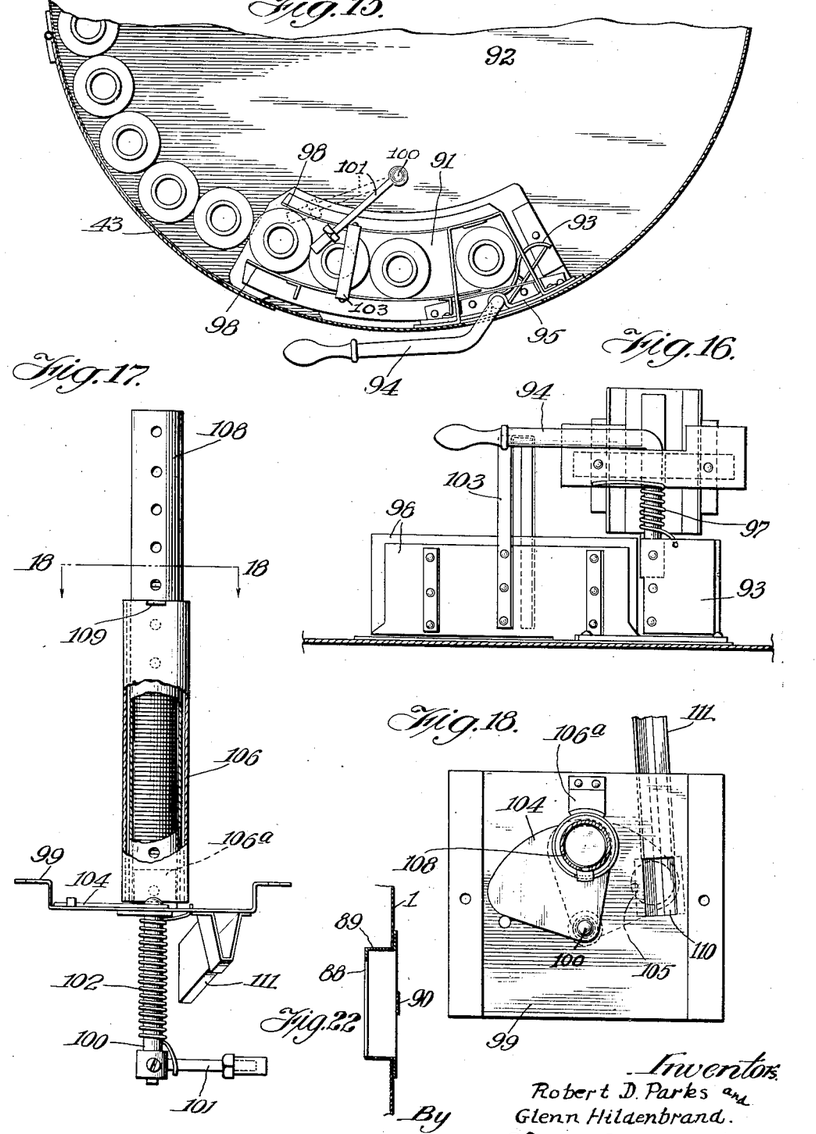
Fig. 15 is an enlarged horizontal sectional view taken on line 15—15 of Fig. 2 to show the manner in which a returned empty bottle operates the rebate coin ejector.
Fig. 16 is an elevational view of this mechanism.
Fig. 17 is an elevational view, partly in section, of the rebate coin ejector.
Fig. 18 is a horizontal setcional view taken through this mechanism on line 18—18 of Fig. 17.
Fig. 22 is a vertical sectional view showing a detail construction taken on line 22—22 of Fig. 1.

The opening 88 is formed in the upright rear wall of a gauge housing 89 set in the casing 1 in the upper part of the compartment 6 so that an empty bottle, after being positioned upright in the housing 89 back of the guard plate 90 extending crosswise over the mouth of the same, may be slid back through the opening 88 and drop into the compartment 6 and come to rest in an upright position in a trough 91 arranged on the bottom wall 92 of said compartment, as shown in Fig. 15. The returned bottle comes to rest in the trough to the rear of a sweep 93 secured to the lower end of a bent handle 94, which is fulcrumed in a suitable bracket 95 secured to the inner side of the casing 1, as shown in Fig. 15. The outer or grasping part of the handle extends outside of the casing 1 through an opening 96 provided in said casing directly beneath the gauge 89, as shown in Fig. 1. The portion of the handle to which the sweep is secured and which is supported by the bracket 95 is arranged inside of the casing 1 and about such portion is a coiled spring 97 so arranged as to normally maintain the sweep in the position shown in Fig. 15 so that an empty bottle may be deposited in the machine to the rear of the sweep. The trough 91 is formed by upright side walls 98, 98 arranged in parallelism and curved to conform to the curvature of the casing 1 and continued for a short distance from the sweep 93 where the trough opens into the compartment 6 so that the returned empty bottles may be moved into the compartment 6 in the operation of the sweep 93, as indicated in Fig. 15. By opening the door 43, the compartment 6 may be reached for the removal of the empty bottles.

The partition wall 39 forms the top wall of the compartment 6 and a flat bracket 99 is secured to the under side of this partition wall above the trough 91. Depending from the bracket 99 to the rear of the trough 91 is a spindle 100, to the lower end of which is secured a horizontally disposed arm 101 which extends over the top of the trough so as to be in the path of movement of the empty bottles therethrough. A coiled spring 102 surrounds the spindle 100 and has its lower end engaged with the arm 101 and its upper end engaged with the bracket 99 so as to turn the arm 101 to a position against an upright stop 103, which extends upward from the side walls of the trough 91.

Secured to the upper end of the spindle 100 on the upper side of the bracket 99 is a segmental plate 104 having an opening 105 of a size and shape to accommodate a coin, such as a nickel, to be returned by the machine. Arranged above this plate is a returned-coin receptacle having an outer casing 106 which extends upward through a tubular guide 107 provided on the bottom wall 15 of the compartment 5 and continues above the normal level of the water therein, as shown in Fig. 2. The inner casing 108 of the coin receptacle has a telescopic fit in the casing 106 and extends above the same, as shown in Figs. 2 and 17, so that said coin holder 108 may be reached for removal through the compartment 5 when it is desired to refill the holder with coins to be returned. The holder 108 has an outwardly extending tongue 109 which rests in a notch at the upper end of the outer casing 106 so as to support the holder in place without resting on the ejector plate 104 to hinder its ease of operation. The outer casing 106 is supported above this plate by a bracket 106a for the same purpose.

To condition the machine for ejecting a nickel for each empty bottle returned to the machine, it is necessary to provide a number of empty bottles in the trough 91 between the sweep 93 and the arm 101, due to the fact that the extent of movement of the sweep is not sufficient to shift a single empty bottle into contact with the arm. With a number of empty bottles interposed, the sweep, when actuated to shift an empty bottle which is deposited in the machine to the rear of the sweep, pushes such bottle against the bottles in advance and causes the foremost bottle to be moved against and past the outer end of the arm 101. This swings the said arm toward the discharge end of the trough 91 and moving the ejector plate 104 to carry a rebate coin from under the coin holder and over an opening 110 in the bracket 99. The coin then passes through the opening and drops into a return chute 111 which extends at a downward inclination toward the casing 1 and terminates at an opening 112 in said casing beneath the handle 94 so that the rebate coin may be reached by the person returning the empty bottle. The arm 101 is removed several bottles from the sweep 93 in order that the arm is at a point where it can not be reached from the opening 88. This prevents anyone tampering with the arm to eject return coins from the machine without operating the arm through the return of empty bottles to the machine.

Arranged on the outside of the casing 1 is a bottle cap remover 113 below which is a receptacle 114 for receiving the caps as they are pulled off the tops of the bottles.

The device of our invention is simple in construction and operation. The parts of the device are durable and strong and will withstand repeated and long use without depreciable wear. Filled bottles are discharged from the platform 27 with ease and dispatch, and no labor is placed on the operator because the parts operate easily and have relatively short movements which provide for quick dispatch of the articles from the machine. The empty bottles may be immediately and readily returned to the device and the rebate coin ejected without difficulty or effort. Interchangeable gauges 89 may be made for the machine so that the machine may be provided with a gauge for the particular size and shape of bottle being dispensed. This will depend of course on the character of the particular bottle as adopted by the manufacturer of the beverages being handled, and the machine therefore may be readily employed for such bottles, the gauge 89 being the only change that is required. The feed rack and the ejector mechanism are all made so as to accommodate the largest size of bottle that may be employed, and with the shim strips 25, 25 the discharge passage 23 may be conditioned for bottles of various diameters by merely removing or adding the necessary strips. The spacing between the shelves of the rack is such as to accommodate the largest diameter so that there is no change required in the shelf construction.

The device as a whole forms a very attractive bottle vender, not only because of its shape of a gigantic bottle and the color suggestive of the liquid contents thereof, but due to the operator playing an important part in ejecting the filled bottles and also the return of the empty bottles to the machine with a rebate coin returned for each empty bottle.

To prevent operation of the machine by coins or tokens of improper size or value, we may make the inner and outer portions of the coin chute as shown in Fig. 21. As illustrated, these chute sections are divided into upper and lower channels by inwardly extending flanges 113a, 114a. These flanges terminate short of each other to provide a slot 115 therebetween. The width of the upper channel is just wide enough to receive the proper coin or token to operate the machine and such coin or token will readily slide down the chute being supported by the flanges 113a, 114a across the slot 115. A larger coin or token will not enter the chute, a smaller coin may enter the chute, but it will be directed into the lower channel of the chute through the slot between the flanges, one of the flanges being inclined downward for the purpose, as shown. The improper coin or token will drop out of the lower channel and not fall into the slots 62, 63 and 64, the guard 61 being above the lower channel to prevent this. The spurious coin or token will be deflected into the opening 66 and drop into the coin receptacle 67 without operating the machine.

The details of construction and arrangement of parts shown and described may be variously changed and modified without departing from the spirit and scope of our invention. However the machine may be employed for vending other articles and we do not wish to limit it to bottle vending except as pointed out in claims which are so expressed.

We claim as our invention:

1. In a bottle vending machine, a rack to support the bottles handled by the machine, means providing a discharge passage for the rack, said rack having inclined shelves for feeding the bottles thereon by gravity into said passage, said shelves having upright side walls to provide troughs for the bottles, and an inclined flange on a side wall of each trough to support the mouth ends of the bottles therein.

2. In a vending machine, means providing a downwardly extending discharge passage for the articles handled by the machine, a depressible platform at the lower end of the passage to receive the articles therefrom, ejector means for ejecting the articles one at a time from the platform, said ejector means supporting the articles in the passage while ejecting an article from the platform, and means for moving the platform up to the articles supported by the ejector means so that the weight of the articles in the passage may be transferred to the platform as soon as released by the ejector means.

3. In a vending machine, means providing a downwardly extending discharge passage for the articles handled by the machine, a depressible platform at the lower end of the passage to receive the articles therefrom, ejector means for ejecting the articles one at a time from the platform, said ejector means supporting the articles in the passage while ejecting an article from the platform, means for moving the platform up to the articles supported by the ejector means so that the weight of the articles in the passage may be transferred to the platform as soon as released by the ejector means, and means for retarding the descent of the platform under the weight of the articles thereon.

4. In a vending machine, means providing a downwardly extending discharge passage for the articles handled by the machine, a depressible platform at the lower end of the passage to receive the articles therefrom, ejector means for ejecting the articles one at a time from the platform, said ejector means supporting the articles in the passage while ejecting an article from the platform, a weight to move the platform up to the articles supported by the ejector mechanism, and a dash pot mechanism providing for the gradual descent of the platform under the weight of the articles thereon when released by the ejector means.

5. In a vending machine, means providing a downwardly extending discharge passage for the articles handled by the machine, a depressible platform at the lower end of said passage to support the articles therein, and an ejector mechanism having a yoke movable over the opposite ends of the platform to support the articles in the passage while ejecting an article from the platform, said mechanism including means for withdrawing the yoke from the platform when the latter has raised to article supporting position.

6. In a vending machine, a rack to support the articles handled by the machine, means providing a discharge passage for the rack, said rack having a tier of downwardly inclined shelves, each shelf having a lug adjacent its discharge end, gates at the discharge ends of the shelves to prevent the feed of the articles thereon into said passage, and a latch member pivotally carried by each gate and having a portion cooperable with the lug to normally hold the gate in closed position, each latch member having a portion engageable by the articles in the discharge passage and when released thereby permitting the opening of the gate controlled by said latch member.

7. In a vending machine, a rack having a tier of downwardly inclined shelves to support the articles handled by the machine, means providing a discharge passage for the rack, said passage crossing the discharge ends of the shelves, gates at the discharge ends of the shelves to prevent the feed of the articles thereon into said passage, and a latch member carried by each gate to normally hold the gates in closed position, each latch member having a portion in the discharge passage on the outer side of the gate, and extending below the same, whereby the latch member will not be released to permit the opening of its gate until after the articles in the discharge passage have passed well below the gate.

8. In a vending machine, a rack having a tier of downwardly inclined shelves to support the articles handled by the machine, means providing a discharge passage for the rack, said passage crossing the discharge ends of the shelves, gates at the discharge ends of the shelves to prevent the feed of the articles thereon into said passage, and a latch member carried by each gate and having a portion in the discharge passage on the outer side of the gate to be pressed inward toward the gate by the articles in the discharge passage in contact with said member for holding the gate in closed position, said latch member when released by the articles moving out of engagement therewith springing outward to unlock the gate and permit it to open its shelf to the discharge passage.

9. In a vending machine, a storage rack having a discharge passage, said rack having shelves to support the articles to be handled by the machine, gates at the discharge ends of the shelves to prevent the feed of the articles thereon into said discharge passage, and latch means for each gate, said latch means extending into the discharge passage for engagement with the articles therein for normally holding the gates in closed position, the releasing of the latch means to permit the opening of the gates being controlled by the movement of the articles in the discharge passage out of engagement with the latch means, said gates being supported by the shelves by having portions slidably engaged therewith.

In testimony whereof we affix our signatures.

R. D. PARKS.
GLENN HILDENBRAND.